United States Patent [19]

Takematsu

[11] Patent Number: 4,509,844
[45] Date of Patent: Apr. 9, 1985

[54] PHOTOMETRIC CIRCUIT IN A PHOTOGRAPHIC FLASH DEVICE

[75] Inventor: Yoshiyuki Takematsu, Tokyo, Japan

[73] Assignee: Fuji Koeki Kabushiki Kaisha, Tokyo, Japan

[21] Appl. No.: 525,955

[22] Filed: Aug. 24, 1983

[30] Foreign Application Priority Data

Aug. 25, 1982 [JP] Japan .............................. 57-146146

[51] Int. Cl.³ ............................................. G03B 15/05
[52] U.S. Cl. ..................................... 354/416; 354/484
[58] Field of Search ........................ 354/416, 417, 484

[56] References Cited

U.S. PATENT DOCUMENTS

| 4,078,240 | 3/1978 | Kaneko et al. | |
| 4,164,686 | 8/1979 | Vital et al. | |
| 4,214,825 | 7/1980 | Mizokami | 354/416 |
| 4,344,680 | 8/1982 | Ishida et al. | 354/416 |
| 4,363,542 | 12/1982 | Kando et al. | 354/416 |
| 4,427,278 | 1/1984 | Ishida et al. | 354/416 |
| 4,441,797 | 4/1984 | Maruyama et al. | 354/416 |

Primary Examiner—Russell E. Adams
Attorney, Agent, or Firm—Finnegan, Henderson, Farabow, Garrett & Dunner

[57] ABSTRACT

An improved photographic flash device of the type in which a photometric circuit exposed to light reflected from a subject being photographed generates a photometric signal which controls the amount of light emitted by the flash discharge tube of the device. A synchronizing switch closed by opening the shutter of the camera with which the device is employed activates a starting circuit to generate a starting signal, which in turn starts a timer powered by the low tension circuit of a DC—DC converter utilized in the flash device. The timer applies a constant voltage to the photometric circuit for a predetermined period of time. Both the starting circuit and timer are capable of reduction to integrated circuit form.

11 Claims, 3 Drawing Figures

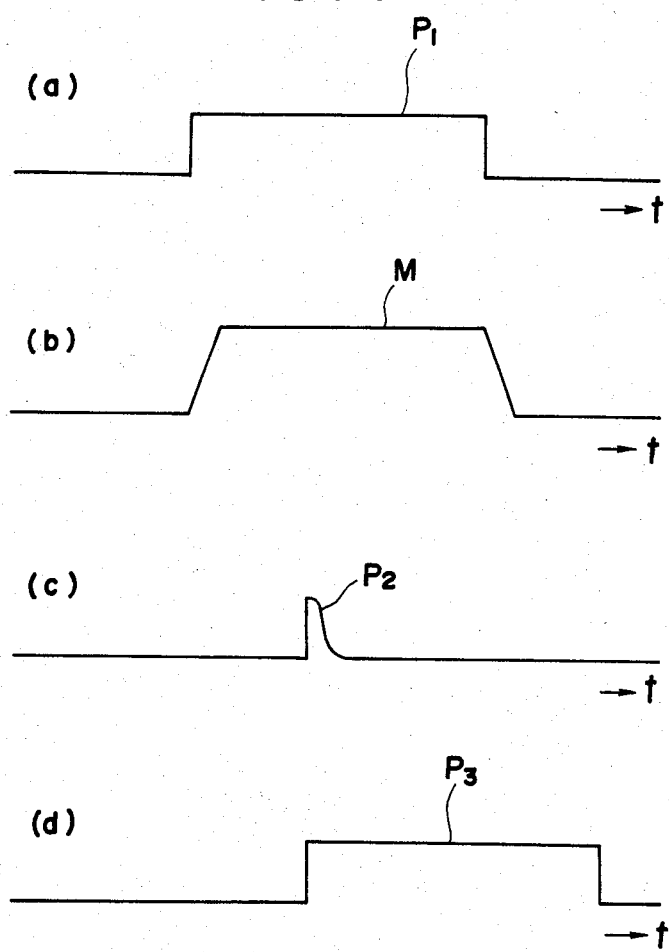

PHOTOMETRIC CIRCUIT IN A PHOTOGRAPHIC FLASH DEVICE

BACKGROUND OF THE INVENTION

1. Field of the Invention

The present invention relates to a photometric circuit for incorporation into a photographic flash device of the type in which the amount of light emitted is automatically adjustable.

2. Background Art

A photographic flash device of the type which automatically adjusts the amount of light emitted is known. Such automatic light emission adjusting flash devices comprise a light emission stopping circuit to stop light emission from the flash discharge tube and a photometric circuit to apply to the light emission stopping circuit a photometric signal, thereby to activate the light emission stopping circuit in accordance with the intensity of light reflected from a subject being photographed.

Many light emission stopping circuits are either of the serial control or the parallel control types. In a serial control light emission stopping circuit, a switching member is connected in series with a flash discharge tube and is turned off when the photometric signal interrupts current to the flash discharge tube, stopping light emission therefrom. In light emission stopping circuits of the parallel control type the switching member is connected in parallel to the flash discharge tube and is turned on by the photometric signal short circuiting the flash discharge tube to stop light emission therefrom.

The photometric circuit usually comprises a photoconductive element which is exposed to light emitted from the flash discharge tube and reflected from the subject being photographed. The photometric circuit photoelectrically converts the light thus received into an electrical signal which is integrated by an integrator. A switching circuit is provided which is activated when the integrated electrical signal reaches a predetermined level.

To protect the photometric circuit against erroneous activation due, for example, to flash emission from the flash device of another photographer, the photometric circuit is adapted to be energized only in synchronization with the start of light emission from the flash discharge tube with which it is associated. This is achieved in known photographic flash devices, for example, by a discharge current from a capacitor which flows through the flash discharge tube as it begins to emit light. The discharge current is utilized to energize the photometric circuit. In an alternative known device the photometric circuit is energized responsive to activation of a trigger circuit which starts light emission from the flash discharge tube.

In the known devices described above the photometric circuit is coupled to the flash discharge tube or to the trigger circuit. Thus the photometric circuit is necessarily incorporated into the high-tension side of the DC—DC converter utilized in such flash devices. As a consequence, the photometric circuit must be at least partially a high-tension circuit in which high voltage withstanding parts or elements are employed, making realization of the photometric circuit in an integrated circuit form difficult.

SUMMARY OF THE INVENTION

One object of the present invention is to eliminate the abovementioned drawbacks of known flash devices.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects and in accordance with the invention as embodied in and broadly described herein, in a camera flash device having a photometric circuit to receive light reflected from a subject being photographed and to generate a photometric signal on the basis of which the amount of light to be emitted by a flash discharge tube is controlled, the improvement comprising a DC—DC converter having high and low tension circuits, the high tension circuit providing DC power to the flash discharge tube, a synchronizing switch operably coupled with the shutter of the camera to close upon the opening of the shutter, a starting circuit controlled by closure of the synchronizing switch to generate a starting signal, and a timer powered by the low tension circuit of the DC—DC converter and activated by the starting signal to apply to the photometric circuit a substantially constant voltage for a predetermined period of time.

In accordance with an alternate embodiment of the invention a photographic flash device having a photometric circuit for exposure to light reflected from a subject being photographed and for generating a photometric signal on the basis of which the amount of light to be emitted by the flash device is controlled is provided with the improvement comprising a shutter control circuit, and a constant voltage generator activated in a response to the shutter control circuit to apply to the photometric circuit a substantially constant voltage in association with shutter operation.

An arrangement is also possible in which the starting signal generated by the starting circuit is applied substantially simultaneously to the timer and to the trigger circuit associated with the flash discharge tube.

BRIEF DESCRIPTION OF THE DRAWINGS

The present invention will be described with additional specificity and detail through use of the accompanying drawings in which:

FIG. 3 is a set of time charts illustrating operation of an alternate embodiment of the present invention.

DESCRIPTION OF THE PREFERRED EMBODIMENT

Figure 1:
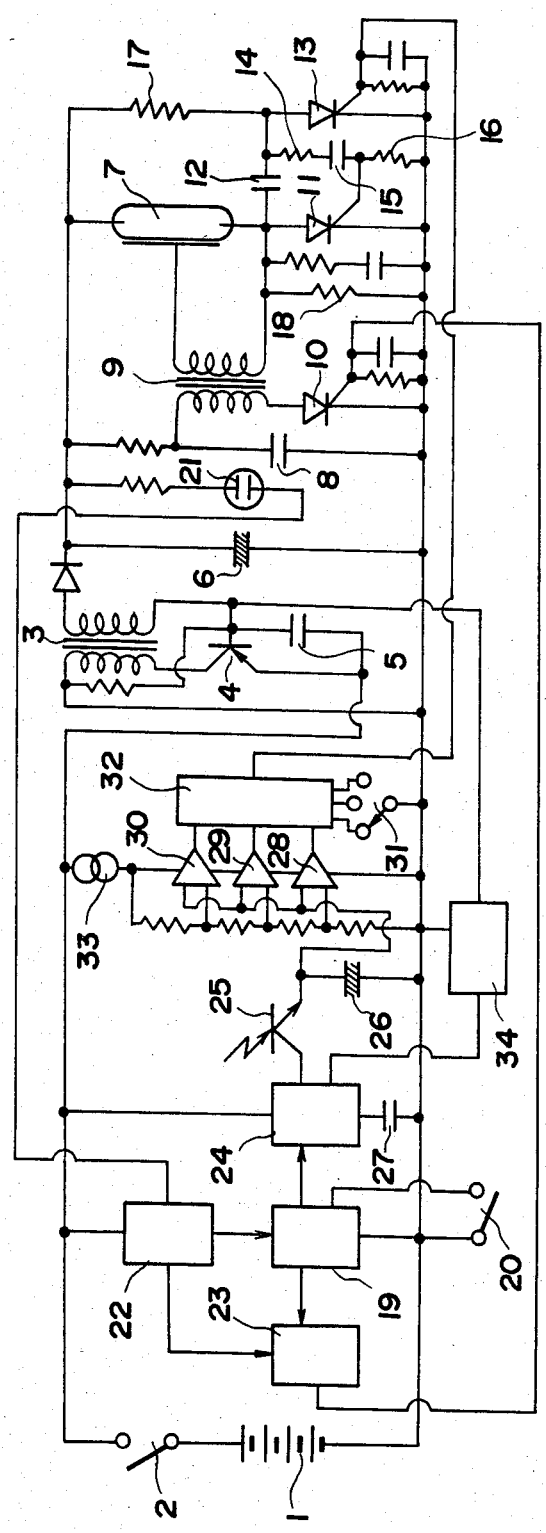
FIG. 1 is a circuit diagram of a photographic flash device provided with a photometric circuit according to the present invention.

Referring to FIG. 1 a known DC—DC converter is shown to comprise a battery 1 which serves as a source, a source switch 2, an oscillation transformer 3, a transistor 4, and a capacitor 5. A main discharge capacitor 6 is charged by the DC—DC converter, and a flash discharge tube 7 emits light upon application thereto of energy stored in main discharge capacitor 6.

A known trigger circuit comprising a trigger capacitor 8, a trigger transformer 9, and a semiconductor-controlled rectifier 10 connected to a discharge circuit for trigger capacitor 8, applies an excitation voltage to flash discharge tube 7.

A semiconductor-controlled rectifier 11 connected in series to flash discharge tube 7 and loop-coupled to both a commutation capacitor 12 and a semiconductor-controlled rectifier 13 functions as a known emission stopping circuit.

A serial impedance circuit consisting of a resistor 14, a capacitor 15, and a resistor 16 is connected as shown in parallel with semiconductor-controlled rectifier 13 to serve as a starting circuit for applying to semiconductor-controlled rectifier 11 a gate voltage to render semiconductor-controlled rectifier 11 conductive. Charging resistors 17, 18 charge commutation capacitor 12 prior to initiation of flash emission.

Starting circuit 19 comprises a semiconductor switching circuit adapted to generate a starting voltage upon closure of a known synchronizing switch 20 and is energized by battery 1 through a switching circuit 22 which is rendered conductive whenever a neon lamp 21 is lit to indicate that charging of starting circuit 19 is occurring. Synchronizing switch 20 is adapted to be closed in a known way in synchronization with opening of the shutter of the camera with which the flash device of FIG. 1 is used.

The starting voltage generating by starting circuit 19 is applied through a buffer circuit 23 as a gate signal to semiconductor-controlled rectifier 10 of the trigger circuit. Consequently, semiconductor-controlled rectifier 10 becomes conductive substantially upon closure of synchronizing switch 20. The buffer circuit 23, though known, is adapted to be energized from battery 1 through the switching circuit 22 and may be provided or omitted as the occasion demands.

A timer 24 starts to operate upon application thereto of the starting voltage from starting circuit 19. Timer 24 emits a constant voltage for a predetermined period. The constant voltage is applied to a photometric circuit comprising a phototransistor 25 serving as a light receiving element and an integration capacitor 26. An adjustable capacitor 27 times the period for which timer 24 operates.

Comparators 28, 29, 30 receive an integrated photometric voltage signal from the photometric circuit. A selector circuit 32 controlled by a change-over switch 31 selects the output of one of comparators 28, 29, 30 according to some criteria of camera operation external to the flash device itself, as for example, lens aperture value or film speed. Comparators 28, 29, 30, together with selector circuit 32, function as an arithmetic circuit according to the position of change-over switch 31 for evaluating the lens aperture value in the camera with which the device of FIG. 1 is used and the integrated photometric signal from the photometric circuit. Output from the arithmetic circuit is applied as a gate signal to semiconductor-controlled rectifier 13 of the light emission stopping circuit to render semiconductor rectifier 13 conductive. The arithmetic circuit is energized by battery 1 through a constant-current circuit 33.

A stopping circuit 34, which may comprise a switching transistor or the like, is activated upon application of a constant voltage from the timer 24 and stops oscillation of the DC—DC converter for as long as timer 24 continues to generate a constant voltage. Stopping circuit 34 stabilizes the voltage across battery 1 during operation of the photometric circuit.

When the circuit described above is incorporated into a photographic flash device, closure of the source switch 2 starts oscillation of the DC—DC converter which then charges capacitors 6, 8, 12. When main discharge capacitor 6 has been charged to a voltage of predetermined level, neon lamp 21 is lit. As a consequence, switching circuit 22 is placed in the conductive state thereof so that starting circuit 19 and buffer circuit 23 are energized by battery 1. When thus energized, upon closure of synchronizing switch 20, starting circuit 19 generates a starting voltage which renders semiconductor-controlled rectifier 10 of the trigger circuit conductive and begins timer 24 operating. Timer 24 in turn applies to the photometric circuit a constant voltage and activates stopping circuit 34, so that the DC—DC converter ceases to oscillate.

As soon as semiconductor-controlled rectifier 10 is rendered conductive, the trigger circuit in known manner applies to flash discharge tube 7 an excitation voltage. Consequently, an initial current flows through flash discharge tube 7 and through the starter circuit consisting of resistors 14, 16 and capacitor 15. A change in the voltage across the starter circuit renders semiconductor-controlled rectifier 11 conductive and starts discharge of flash discharge tube 7.

When the integrated photometric signal in the photometric circuit has increased up to a predetermined value, the particular comparator of comparators 28, 29, 30 selected by change-over switch 31 is activated, and an output signal from that comparator renders semiconductor-controlled rectifier 13 of the light emission stopping circuit conductive. With the semiconductor-controlled rectifier 13 being in its conductive state, the charging voltage of commutation capacitor 12 is applied across the anode and cathode of semiconductor-controlled rectifier 11 as an inverse voltage and this semiconductor-controlled rectifier 11 is rendered nonconductive. As a consequence, flash discharge tube 7 ceases to emit light.

Thus the period for which flash discharge tube 7 emits light is dependent upon the measured value of light reflected from the subject being photographed and the value of lens aperture employed. It is possible to arrange the arithmetic circuit so that film sensitivity can also be processed simultaneously.

Timer 24 is designed to generate a constant voltage during the entire period of light emission by flash discharge tube 7. Thus, stopping circuit 34 is restored to its initial state when timer 24 is reset and the constant voltage disappears. Accordingly, the DC—DC converter resumes oscillation immediately upon restoration of the stopping circuit 34, if source switch 2 is then in the closed position.

Figure 2:
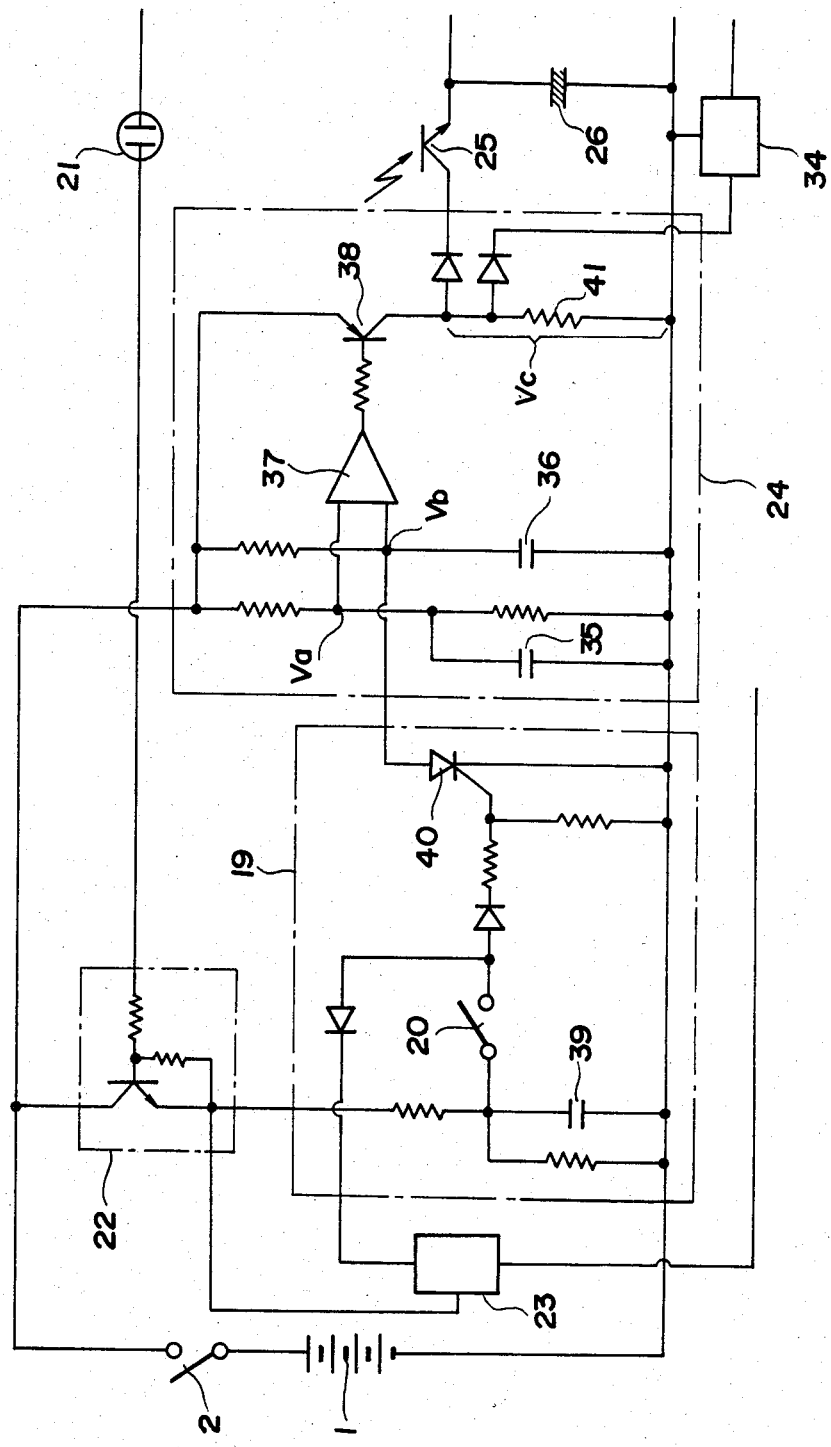
FIG. 2 is a detailed circuit diagram of the starting circuit and timer incorporated into the flash device of FIG. 1.

FIG. 2 illustrates in detail starting circuit 19 and timer 24, which are both of known arrangement. In FIG. 2, elements which are identical or similar to those shown in FIG. 1 are designated by corresponding reference numerals.

Upon closure of source switch 2, a first capacitor 35 and a second capacitor 36 both included in the timer 24 begin to charge, and input voltages Va, Vb to a comparator 37 proceed to rise. First capacitor 35 is designed to have greater capacitance than second capacitor 36, so that the input voltage Vb reaches a pre-determined value faster than the input voltage Va. Thus, during a period for which first and second capacitors 35, 36 are charging, Va<Vb, but ultimately thereafter Va=Vb. Comparator 37 is not activated when Va≧Vb, thus keeping switching transistor 38 non-conductive when capacitors 35, 36 are both charged. This in turn precludes application of a voltage to the photometric circuit, including phototransistor 25 and integration capacitor 26.

As explained above, when main discharge capacitor 6 becomes charged to a pre-determined level neon lamp 21 is lit and simultaneously switching circuit 22 is rendered conductive. In response, a capacitor 39 included in starting circuit 19 is charged and buffer circuit 23 is energized in readiness for operation.

Upon closure of synchronizing switch 20, the voltage stored in capacitor 39 is applied simultaneously to both the gate of a semiconductor-controlled rectifier 40 and through buffer circuit 23 to the gate of semiconductor-controlled rectifier 10 included in the trigger circuit. As a result, semiconductor-controlled rectifiers 10, 40 are rendered conductive.

As has already been described the trigger circuit is activated and flash discharge tube 7 emits light when semiconductor-controlled rectifier 10 is conductive. When semiconductor-controlled rectifier 40 is also in its conductive state, the stored energy in second capacitor 36 is discharged and input voltage Vb drops to a low level. When this occurs, semiconductor-controlled rectifier 40 is returned to its non-conductive state and second capacitor 36 begins again to be charged.

During this charging process input voltages Va, Vb are such that Va>Vb, so that comparator 37 is activated and transistor 38 is turned on. Correspondingly, a constant voltage Vc appears across a collector resistance 41 of transistor 38 throughout the period of time from the point at which second capacitor 36 begins to be charged to the time at which the relationship, Va=Vb, is again established, and voltage Vc is applied to the photometric circuit.

FIG. 3 is a set of time charts depicting operation of an alternate embodiment of a flash device according to the teaching of the present invention wherein synchronizing switch 20 is replaced by a trigger signal generator activated in response to a control circuit for the camera shutter. FIG. 3(a) illustrates a shutter control signal $P_1$; FIG. 3(b) is a curve M representing mechanical operation of the shutter; and FIG. 3(c) illustrates a trigger signal $P_2$ generated by the signal generator in response to the shutter control circuit through timer 24 or the like for application to circuit 19 to activate the latter.

It is possible in addition to provide a constant-voltage generator activated responsive to the shutter control circuit for generating a constant voltage $P_3$, as illustrated in FIG. 3(d). Voltage $P_3$ may be applied directly to the photometric circuit and trigger circuit, and starting circuit 19 and timer 24 may be omitted.

As described, the present invention is based on an arrangement of a flash device in which there is provided a timer adapted to apply to a photometric circuit a substantially constant voltage for a pre-determined period, the timer being energized from a DC—DC converter serving as a DC source. In a device according to the present invention, it is possible to form the timer and the photometric circuit separately from any light emission circuit, including such elements as a main discharge capacitor and a flash discharge tube. Thus, the timer is never subjected to a high voltage, and no high voltage withstanding elements are required in the timer circuit. Such a feature facilitates production of the timer and the photometric circuit in the form of an integrated circuit.

Furthermore, the arrangement of the arithmetic circuit, as described above, permits it together with the other circuits to also be realized in integrated form. An arrangement is also possible in which the photometric circuit receives a constant voltage from a constant-voltage generator activated in response to the shutter control circuit. In such a case, the constant-voltage generator is a low-tension circuit easily realized through IC techniques.

The first embodiment of the present invention may be modified so that the output voltage of timer 24 is applied to the trigger circuit for flash discharge tube 7 to activate the trigger circuit. Further, starting circuit 19 may be connected to a high-tension circuit of the DC—DC converter and energized therefrom.

It will be apparent to those skilled in the art that modifications and variations can be made in the apparatus of this invention. The invention in its broader aspect is, therefore, not limited to the specific details, representative methods and apparatus, and illustrative examples shown and described. Accordingly, alterations may be made from such details without departing from the spirit or scope of general inventive concept.

What is claimed is:

1. In a camera flash device having a photometric circuit to receive light reflected from a subject being photographed and to generate a photometric signal on the basis of which the amount of light to be emitted by a flash discharge tube is controlled, the improvement comprising:
   a. a DC—DC converter having high and low tension circuits, said high tension circuit providing DC power to said flash discharge tube;
   b. a synchronizing switch operably coupled with the shutter of said camera to close upon the opening thereof;
   c. a starting circuit controlling by closure of said synchronizing switch to generate a starting signal; and
   d. a timer powered by said low tension circuit of said DC—DC converter and activated by said starting signal to apply to said photometric circuit a substantially constant voltage for a predetermined period of time.

2. The flash device as recited in claim 1, wherein a trigger circuit is associated with said flash discharge tube, and said starting signal generated by said starting circuit is applied substantially simultaneously to said timer and to said trigger circuit.

3. The flash device as recited in claim 1, wherein a trigger circuit is associated with said flash discharge tube and said substantially constant voltage generated by said timer is applied both to said photometric circuit and to said trigger circuit.

4. The flash device as recited in claim 1, wherein said starting circuit in addition to said timer is powered by said low tension circuit of said DC—DC converter.

5. The flash device as recited in claim 1, wherein said starting circuit is energized from said high tension circuit of said DC—DC converter.

6. In a camera flash device having a photometric circuit to receive light reflected from a subject being photographed and generate a photometric signal on the basis of which the amount of light to be emitted by a flash discharge tube is controlled, the improvement comprising:

a. a DC—DC converter having high and low tension circuits, said high tension circuit providing DC power to said flash discharge tube;
b. a shutter control circuit for generating a trigger signal upon activation of the shutter of said camera;
c. a starting circuit to generate a starting signal upon application of said trigger signal; and
d. a timer powered by said low tension circuit of said DC—DC converter and activated by application of said starting signal to apply to said photometric circuit a substantially constant voltage for a predetermined period of time.

7. The flash device as recited in claim 6, wherein a trigger circuit is associated with said flash discharge tube and said starting signal generated by said starting circuit is applied substantially simultaneously to said timer and to said trigger circuit.

8. The flash device as recited in claim 6, wherein a trigger circuit is associated with flash discharge tube and wherein said substantially constant voltage generated by said timer is applied both to said photometric circuit and to said trigger circuit.

9. The flash device as recited in claim 6, wherein said starting circuit in addition to said timer is powered by said low tension circuit of said DC—DC converter.

10. The flash device as recited in claim 6, wherein said starting circuit is energized from said high tension circuit of said DC—DC converter.

11. In a camera flash device having a photometric circuit to measure light reflected from a subject being photographed and to generate a photometric signal on the basis of which the amount of light to be emitted by a flash discharge tube is controlled, the improvement comprising:
a. a DC—DC converter having high and low tension circuits, said high tension circuit providing DC power to said flash discharge tube;
b. a control circuit for the camera's shutter;
c. a trigger signal generator activated in response to activation of the shutter control circuit to generate a trigger signal;
d. a starting circuit adapted to generate a starting signal to initiate light emission from said flash discharge tube under control of said trigger signal generated by said trigger signal generator; and
e. a timer powered by the low tension circuit of said DC—DC converter and activated by said starting signal to apply to said photometric circuit a substantially constant voltage for a predetermined time.

* * * * *